United States Patent
Giroir et al.

(10) Patent No.: US 6,819,673 B1
(45) Date of Patent: Nov. 16, 2004

(54) METHOD AND SYSTEM FOR ESTABLISHING SNA SESSIONS OVER WIDE AREA NETWORKS

(75) Inventors: Didier Giroir, Cagnes sur Mer (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 09/690,209

(22) Filed: Oct. 17, 2000

(30) Foreign Application Priority Data

Nov. 25, 1999 (EP) ............................................ 99480121

(51) Int. Cl.[7] .............................................. H04L 12/28
(52) U.S. Cl. ...................................... 370/400; 370/401
(58) Field of Search ................. 709/226; 370/229–238, 370/252–255, 386, 389–390, 401, 432, 463, 466, 462

(56) References Cited

U.S. PATENT DOCUMENTS 5,715,395 A * 2/1998 Brabson et al. ............. 709/226
5,802,053 A * 9/1998 Bollella et al. ............. 370/401

* cited by examiner

*Primary Examiner*—Douglas Olms
*Assistant Examiner*—Robert W. Wilson
(74) *Attorney, Agent, or Firm*—Daniel E. McConnell; John R. Pivnichny; Dillon & Yudell LLP

(57) ABSTRACT

A method and system for establishing a Systems Network Architecture (SNA) session between SNA resources through a packet/cell switching network. The packet/cell switching network includes an origin access node that provides client access services, and at least one destination access node that provides server access services. In accordance with the method of the present invention a SNA session request is received from a source SNA resource for establishing an SNA session with a target SNA resource. An undirected message is broadcast over the packet/cell switching network to identify the destination access nodes that support the source SNA resource and that provide server access services. One or more positive replies are received from respectively one or more of the destination access nodes that support the source SNA resource and that provide server access services. As part of the receiving step, information relating to a traffic handling capacity of the destination access node and information related to establishment of a connection between the origin access node and the destination access node is retrieved. Finally, a destination access node is selected in accordance with the information describing the destination node and in accordance with the information related to establishment of a connection between the origin access node and the destination node.

35 Claims, 6 Drawing Sheets

METHOD AND SYSTEM FOR ESTABLISHING SNA SESSIONS OVER WIDE AREA NETWORKS

BACKGROUND OF THE INVENTION

1. Technical Field

The present invention relates to Wide Area Networks (WANs) and more particularly to a system and method for establishing Systems Network Architecture (SNA) sessions between SNA nodes through a packet/cell switching network using Telnet 3270 access services.

2. Description of the Related Art

SNA and IP Environment

Companies are increasingly interested in consolidating the multiple specialized networks that they operate or lease from service providers onto a single protocol network. These multiple specialized networks operate on diverse networking technologies such as SNA, Internet Protocol (IP) or Internetwork Packet Exchange (IPX). In making consolidation one of their top priorities, companies are almost exclusively selecting IP as their protocol of choice. For the overwhelming majority of these companies that are using SNA protocols and applications, however, there remains the need to maintain the ability to access the enormous quantity of existing corporate data that resides in traditional mainframes and only accessible through SNA applications.

Telnet 3270

In an IP environment, telnet technologies TN3270 and TN3270 Extended are widely utilized to transport SNA information across an IP network. This technique for SNA "green screen" workstation users employs a client/server approach. IBM's "Host On Demand" or "WebClient" by CISCO are examples of client software implementations. Network Utility from IBM or CISCO router's offerings are typical server implementations (hardware and software). The "TN3270 client" component usually runs within the customer's workstation while the "TN3270 server" component is usually placed in front of the customer's Data Center mainframes (or sometimes directly within the mainframe itself) or within the customer's branch offices. As illustrated in FIG. 1, IP protocols (102) are used between a server (100) and clients (101), while traditional SNA protocols (103) are used between server (100) and target SNA applications (104) located within a mainframe.

More detailed explanations of telnet, TN3270, and Network Utility, can be found in the following publications incorporated herewith by reference: "TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05; "Internet in a nutshell" by Valerie Quercia, published by O'Reilly, October 1997; "IBM 2216/Network Utility Host Channel Connection", Erol Lengerli, Jacinta Carbonell, Thomas Grueter; IBM International Technical Support Organization, January 1999, SG24-5303-00; "IBM Network Utility Description and Configuration Scenarios", Tim Kearby, Peter Gayek, Gallus Schlegel, Imre Szabo, Zhi-Yong Zhang; IBM International Technical Support Organization, January 1999, SG24-5289-00; "Internetworking with TCP/IP—Volume I—Principles, Protocols, and Architecture" Douglas E.Comer, Second Edition, Prentice Hall 1991; Request For Comments (RFCs) from the Internet Engineering Task Force (IETF): RFC 1576: TN3270 Current Practices, RFC 1646: TN3270 Extensions for LU name and Printer Selection, RFC 1647: TN3270 Enhancements, and RFC 2355: TN3270 Enhancements.

High Speed Packet Switching Networks

Data transmission is evolving to focus on applications and to integrate a fundamental shift in the customer traffic profile. Driven by the growth of the number of intelligent (programmable) workstations, the pervasive use of local area network interconnections, the distributed processing capabilities between workstations and super computers, the new applications and the integration of various and often conflicting structures—hierarchical versus peer to peer, wide versus local area networks, voice versus data—the data traffic profile has become more bandwidth consuming, bursty, non-deterministic, and requires greater connectivity.

Based on the above observations, there is a growing need for supporting distributed computing applications across high speed wide area networks that can carry local area network communications, voice, video and data traffic among channel attached hosts, business or engineering workstations, terminals, and small to large file server systems. This vision of a high speed multi-protocol network has precipitated the emergence of fast packet switching network architectures such as the IBM's Networking BroadBand Services (NBBS) architecture in which data, voice, and video information is digitally encoded, divided into small packets (of fixed or variable length), and transmitted through a common set of nodes and links. In this continuously evolving environment there remains the need for transporting "legacy" data traffic, such as SNA traffic across wide area networks.

To efficiently transport mixed traffic streams on very high speed lines requires a set of strict requirements in terms of performance and resource consumption that can be summarized as follows: a very high throughput and a very short packet processing time; an efficient set of flow and congestion control mechanisms; and a very large flexibility to support a wide range of connectivity options.

Throughput and Processing Time

One of the key requirements of high speed packet switching networks is to reduce the end-to-end delays in order to satisfy real time delivery constraints and to achieve the necessary high nodal throughput for the transport of voice and video. Increases in link speeds have not been matched by proportional increases in the processing speeds of communication nodes. The fundamental challenge for high speed networks such as those based on NBBS technologies is thus to minimize the packet processing time and to take full advantage of the high speed/low error rate technologies.

Most of the transport and control functions provided by the new high bandwidth network architectures are performed on an end-to-end basis. The flow control and particularly the path selection and bandwidth management processes are managed by the access points of the network (where the NBBS access services reside), which reduces both the required awareness and functionality of the intermediate nodes.

Congestion and Flow Control

Communication networks have at their disposal limited resources to ensure efficient packet transmissions. An efficient bandwidth management strategy is essential to take full advantage of a high speed network. While transmission costs per byte continue to drop year after year, these costs are likely to continue to represent the major expense of operating future telecommunication networks as the demand for bandwidth increases. Thus, considerable efforts have is been spent on designing flow and congestion control processes, bandwidth reservation mechanisms, routing algorithms to economically manage the network bandwidth.

An ideal network should be able to transmit an amount of traffic that is directly proportional to the traffic offered to the network to the maximum transmission capacity. Beyond this limit, the network should operate at its maximum capacity regardless of demand.

Connectivity

In high speed networks, the nodes must provide total connectivity. This includes attachment of end user devices, regardless of vendors or protocols. The network nodes must also be able to allow an end user device to communicate with any other device or group of devices, when justified or required. The network must support any type of traffic such as data (including "legacy" data), voice, video, fax, graphic or image related traffic. Nodes must be able to take advantage of all common carrier facilities and be adaptable to a plurality of protocols. All required conversions must be automatic and transparent to the end user.

High Speed Networks Services

The architectures of most high speed packet switching networks specify a set of generic services that offer end-to-end high bandwidth transport capabilities.

The present invention relates to transmissions in wide-area networks (WANs) based on the IBM's NBBS architecture described in International Business Machine publication "IBM International Technical Support Centers—Networking Broadband Services (NBBS)—Architecture Tutorial—GG24-4486-00" dated June 95. NBBS services can be divided into three major areas Transport Services:

Transport services provide a common infrastructure to support the transfer of information across the network. They are not used directly but through the access services (access Agents). Such transport services can be divided into three distinct functions: a Logical Link Layer; a Network Connection Layer; and the various Transport Protocols.

Network Control Services:

Network control services ensure that the transport and access services operate reliably, efficiently, and as automatically as possible. They are used to control, allocate, and manage the resources of the network on a real-time basis. They also provide network operators with the various facilities that are needed to configure, operate, and maintain the network on a day-to-day basis. This includes facilities for monitoring the performance of the network, accounting for its usage, and resolving problems.

Access Services:

Access services (access agents) provide an interface between the common high speed network (or backbone network) and external devices or networks via access link interfaces. The access services enable a wide range of external devices to get access to the common infrastructure provided by the transport services.

Together, the transport, network control and access services provide the capability to support communications between many different types of communicating devices through a common network infrastructure.

Problems Addressed by the Invention

The TN3270 and TN3270 Enhanced (TN3270E) protocols require a full implementation of the complete suite of TCP/IP protocols. Implementing a full set of TCP/IP protocols is not only a complex task but also requires that each TN3270 node becomes a router with all the associated functionality. This results in complexities and severe overhead to account for router-to-router protocols that are not actually required for transporting SNA data. In traditional SNA networks, TN3270 services usually require a dedicated box, called a Telnet 3270 server. This Telnet 3270 server performs the conversion of SNA protocols to TCP/IP protocols and vice versa.

SUMMARY OF THE INVENTION

A method and system for establishing a Systems Network Architecture (SNA) session between SNA resources through a packet/cell switching network are disclosed herein. The packet/cell switching network includes an origin access node that provides client access services, and at least one destination access node that provides server access services. In accordance with the method of the present invention a SNA session request is received from a source SNA resource for establishing an SNA session with a target SNA resource. An undirected message is broadcast over the packet/cell switching network to identify the destination access nodes that support the source SNA resource and that provide server access services. One or more positive replies are received from respectively one or more of the destination access nodes that support the source SNA resource and that provide server access services. As part of the receiving step, information relating to a traffic handling capacity of the destination access node and information related to establishment of a connection between the origin access node and the destination access node is retrieved. Finally, a destination access node is selected in accordance with the information describing the destination node and in accordance with the information related to establishment of a connection between the origin access node and the destination node.

Establishing a connection between said origin access node and said selected destination access node in accordance with said selecting step.

All objects, features, and advantages of the present invention will become apparent in the following detailed written description.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

DETAILED DESCRIPTION OF THE PREFERRED EMBODIMENT

The present invention integrates the TN3270 services within the wide area networks taking advantage of all the features provided by WANs. Such integration helps address the problem of recognizing and differentiating lower level priority traffic such as printer related traffic from higher priority traffic such as real-time display related traffic.

Extension of Networks

To remain competitive, network users are extending their traditional internal SNA and IP networks outward to business partners, dealers, suppliers, and customers. In this expanding environment, users are also searching for ways to save money and provide connectivity between their mix of SNA and TCP/IP server applications and their TCP/IP and SNA desktop client population.

Consolidation of Networks

Many companies today are considering the consolidation of their wide area network (WAN) traffic onto a single IP-only backbone. At the same time, other companies are simplifying their workstation configurations and attempting to only run the TCP/IP protocol stack at the desktop. However, most of these latter companies still require access to SNA applications hosts.

TN3270 and TN3270 E

Figure 1:
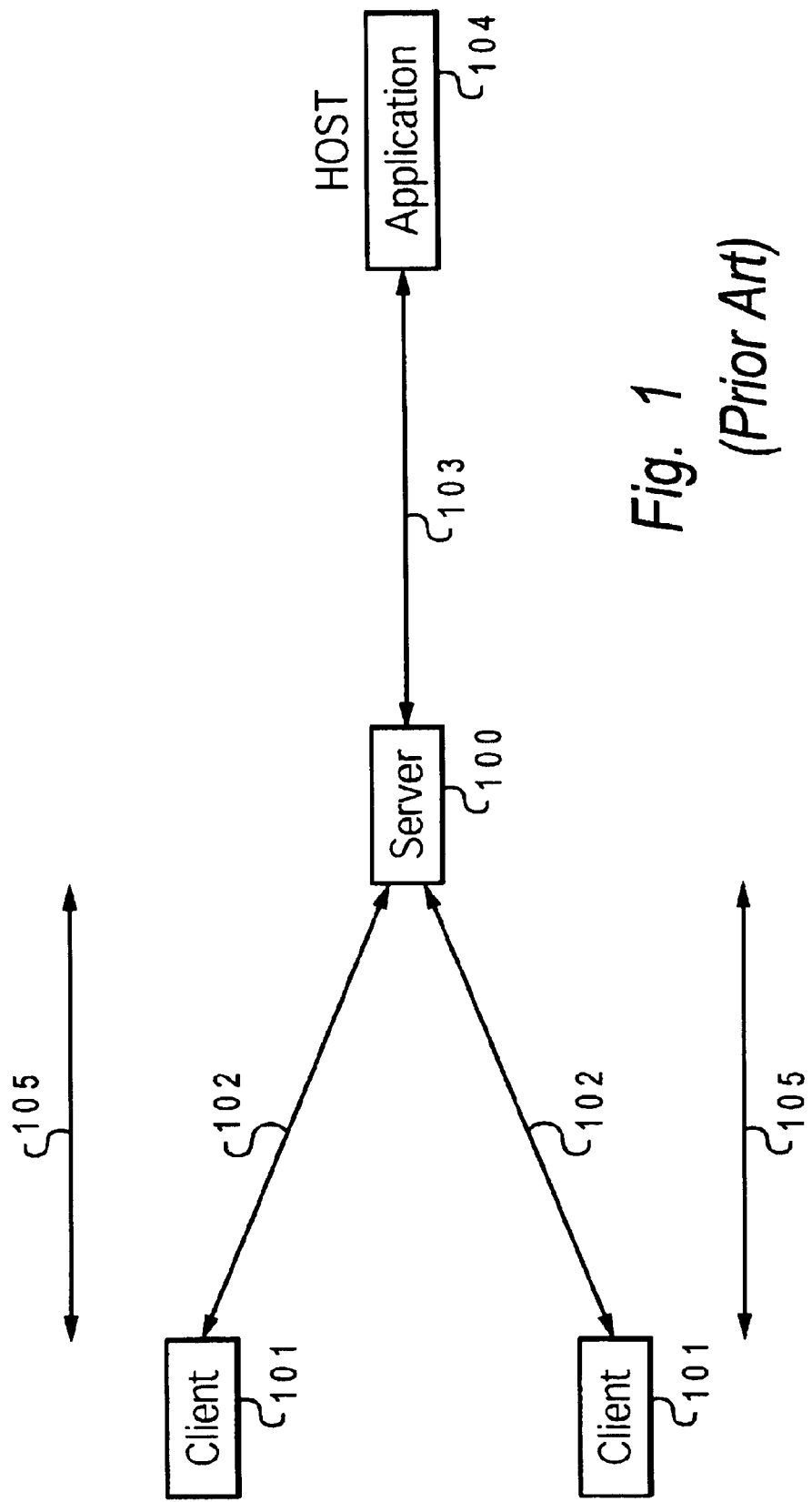
FIG. 1 illustrates the various protocols (SNA, IP and TCP) utilized in TN3270 services in accordance with the prior art.

With reference now to the figures, and in particular with reference to FIG. 1 there are illustrated the various protocols (SNA, IP and TCP) utilized in TN3270 services in accordance with the prior art. As shown in FIG. 1, TN3270 allows end user stations (clients) 101 to run IP over a network to access an SNA host 104 through a TN3270 server 100. TN3270 clients 101 connect to TN3270 server 100 using Transmission Control Protocol (TCP) connections 105. TN3270 server 100 provides a gateway function for the downstream TN3270 clients 101 by mapping client sessions 105 to SNA dependent Logical Unit- Logical Unit (LU-LU) sessions 103 that TN3270 server 100 maintains with a SNA host 104. TN3270 server 100 includes the requisite functionality for performing the conversion between TN3270 data stream and an SNA 3270 data stream.

As mentioned above, the path from a TN3270 client 101 to SNA host 104 includes a TCP connection 105 over IP from client 101 to server 105, and an SNA LU-LU session 103 from the server to host application 104. Connecting to a host to establish an LU-LU session can be accomplished using a traditional subarea connection or using an Advanced Peer to Peer Networking. (APPN) connection.

To deploy a TN3270 solution, TN3270 client software is installed on clients 101 and TN3270 server software is installed in one of several places in server 100 as described in further detail below.

TN3270 Client Software

Client software runs on top of the TCP/IP stack in a client workstation. A given client product provides one of two possible levels of standards support: Base TN3270 client conforming to RFC 1576 (TN3270 Current Practices) and/or RFC 1646 (TN3270 Extensions for LU name and Printer Selection); or TN3270 E client conforming to RFC 1647 (TN3270 Enhancements), and RFC 2355 (TN3270 Enhancements). A server that can support TN3270 E clients is called a TN3270 E server.

TN3270 Server Software

The TN3270 server function 100 can be placed in a variety of products and positions within a network, including: the SNA host itself; a router in front of the data host or within the network; or a specialized box within the network.

TN3270 Access in High Speed Network

Figure 2:
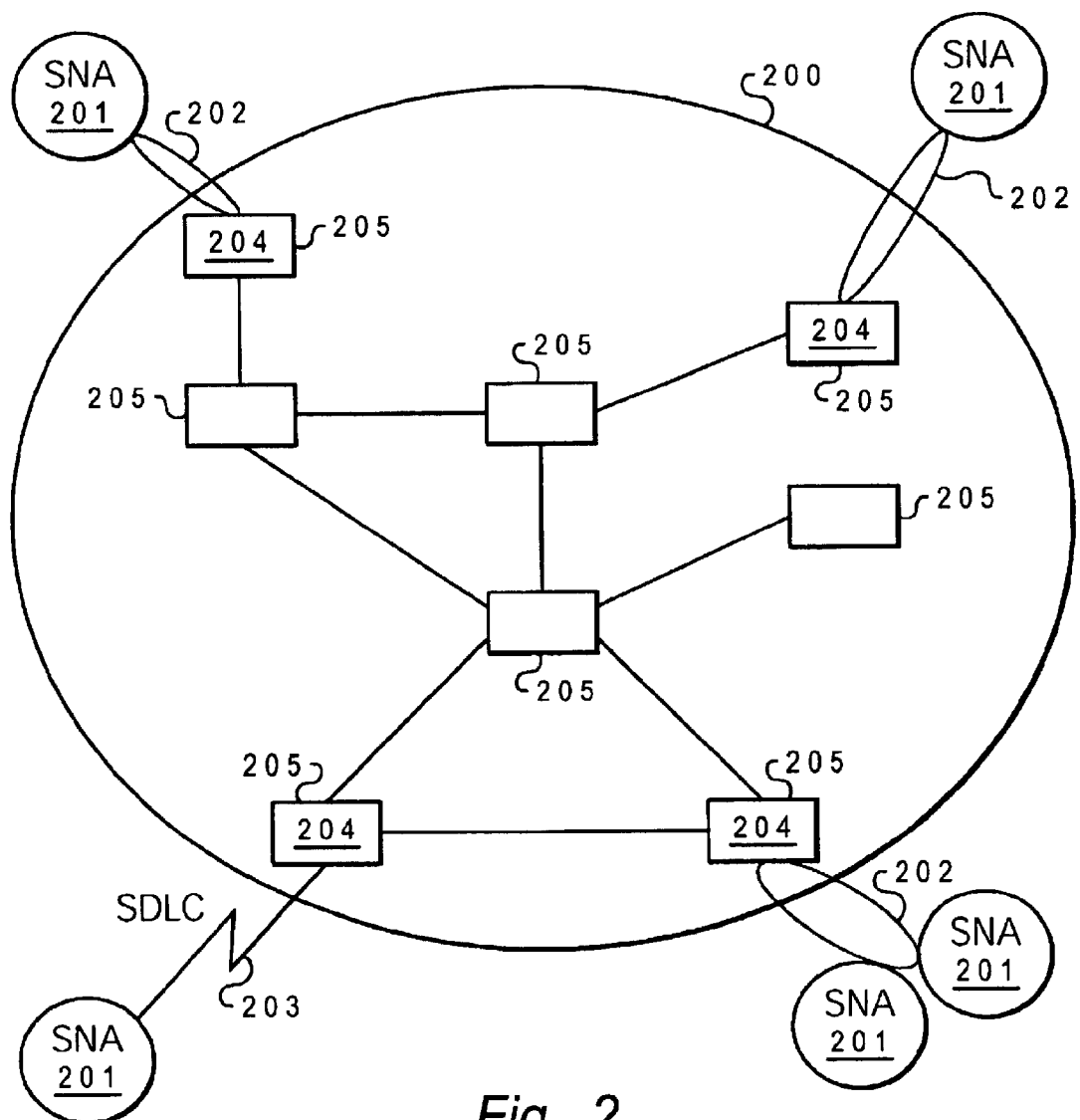
FIG. 2 depicts a packet switching network that utilizes TN3270 capable broadband service nodes to provide inter-network SNA node connectivity in accordance with a preferred embodiment of the present invention.

Turning now to FIG. 2 there is depicted a packet switching network 200 that utilizes TN3270 capable broadband service nodes to provide internetwork SNA node connectivity in accordance with a preferred embodiment of the present invention. As illustrated in FIG. 2, several SNA nodes 201 communicate through network 200 using communication lines provided by private carriers or by public data networks service providers. Each SNA node can be described as either an SDLC attached device 203 or, a LAN attached device 202 within groups of SNA devices such as workstations or personal computers attached to a shared Local Area Network 202.

SNA nodes 201, are spread throughout different establishments and require interconnection through wide area transport facilities. Different approaches can be used for organizing the WAN data transfer. Some implementations involve checking for data integrity at each node within packet-based network 200. Such an approach, however, slows down the rate of transmission.

Other implementations seek to achieve high speed data transfer by optimizing routing and switching techniques for transferring packet among nodes 201 to process the packets flowing toward their final destination at the highest possible rate. The present invention belongs to the latter category (more particularly to the fast packet switching network architecture described in the following paragraphs) while still preserving the data integrity objectives that are an integral and unavoidable part of the transport of SNA information.

High Performance Packet Switching Networks

As further illustrated in FIG. 2, a fast packet switching transmission system 200 includes eight nodes 205, each of which are interconnected by means of high speed communication lines called "trunks". User access to high speed network 200 is realized through access nodes 204 located at the periphery of network 200. An access node 204 is a network node that provides access services such as the Telnet 3270 access services as described herein. Access nodes 204 include one or more ports (not depicted). Each of these ports provide an access point for attaching external devices by supporting standard interfaces to network 200 and by performing the conversions required for the transport of user data flows across network 200 to and from other external devices. As utilized herein, an access node 204 interfacing an SNA node via an SDLC line or a LAN is called a TN 3270 node 204.

NBBS Network Nodes

Intranetwork nodes 205 may be more specifically referred to as NBBS network nodes. A NBBS network node 205 includes a routing point in which incoming data packets are selectively routed on outgoing trunks towards the neighboring transit nodes (other intermediate NBBS nodes 205 within the destination path). Such routing decisions within routing points are made according to the information contained in the header of the data packets. In addition to the basic packet routing function, the network nodes 205 provide ancillary services such as: determinating routing paths for packets originated in the node; providing directory services for finding and updating location information about network users and resources; maintaining a consistent view of the physical network topology, including link utilization; and reserving resources within access nodes 204.

Routing Points

All the information necessary for the routing function, about the nodes and transmission links connected to the nodes, are contained in a network topology database. Under steady state condition, every Routing Point has the same view of the network. The network topology information is updated when new links are activated, new nodes added to the network, when links or nodes are dropped or when link loads change significantly. The fact that the network topology is kept current in every node through continuous updates allows for dynamic network reconfigurations without disrupting end users logical connections (sessions).

Network Control Services

Network control services control, allocate, and manage the resources of the physical network 200. Each routing point includes processing functionality for implementing the foregoing functions in a route controller mechanism. Such network control functionality is utilized to facilitate communications (connection-oriented or connectionless) between user applications. In particular, the network control services include: directory services, bandwidth management, path selection, control'spanning tree, topology update, and congestion control.

Directory services are utilized for retrieving and maintaining information about network users and resources. The directory services use the Control Point Spanning Tree to multicast messages across network 200 that in the depicted embodiment is an NBBS network. Bandwidth management is utilized for processing the bandwidth reservation and maintenance messages, and also for monitoring the current reservation levels on links. Path selection is utilized for selecting the optimal path between source and destination nodes within the network based on the user's traffic characteristics, quality of service requirements and link utilization levels. Control Spanning Tree is utilized for establishing and maintaining a routing tree among the network nodes 205, for distributing control information (in parallel) including link utilization, and for updating the topology database of the nodes with new network configurations or link/node failures.

Topology update is utilized for distributing and maintaining (using the Spanning Tree) information about the logical and physical network (including link utilization information) in every node 205 Congestion control is utilized for enforcing the bandwidth reservation agreements between the network users and the network which are established at the set up time, for estimating actual bandwidth and for adjusting reservation if necessary, for the duration of a communication session.

Topology Database (TDB)

The topology database contains information about nodes, links, their properties, and bandwidth allocation. This topology information is replicated in each node 205 of network 200. An algorithm is utilized to guarantee the correctness of each node's topology database when links and nodes are added or deleted or when their characteristics change. The topology database includes: the physical topology of the network that comprises static information such as the physical characteristics of nodes and links; the state of nodes and links; and link utilization which includes dynamic characteristics such as current bandwidth (used and reserved), real-time measurements, etc.

The topology database is organized such that for each node and link resource in the network is associated an entry in the database. In particular, each link entry includes the following property characteristics: transmission medium and speed, routing mode supported, maximum packet size, link buffer capacity, propagation delay, and supported bandwidth reservation. Each link entry also includes a link state as characterized by: on-line (link can accept user connections), quiescent (link cannot accept additional user connections, but existing connections continue), off-line (link cannot accept user connections and existing connections are canceled). Finally, a link entry includes link utilization characteristics such as real-time measurements and reserved bandwidth.

The topology maintenance for nodes and links consists of advertising and gathering the updates that occur inside the network. Such changes can be categorized into one of three types. The first type relates to link physical properties such as additional links, link removal, reconfiguration, etc. The second type relates to link state, and the third type relates to dynamic link utilization.

The concept of distributed topology assumes that each control point has the same view of the network.

Access Services

Most high speed networks have the ability to support a diverse range of high speed multimedia telecommunication services using common equipment. Each access service (also called access agent) provides support for a particular set of telecommunication services—ATM (Asynchronous Transfer Mode), FR (Frame Relay), PCM (Pulse Code Modulation) voice, Circuit emulation, HDLC (High-level Data Link Control), etc.—and enables access agents to transport traffic across a common network, such as network 200.

Each NBBS network node 205 contains one or many of these access agents, depending on the physical interfaces it attaches to and on the access protocols it understands and supports. Access agents are located in the access nodes and in a preferred embodiment, are located in the access link interfaces of the adapters connected to external communication devices.

Figure 4:
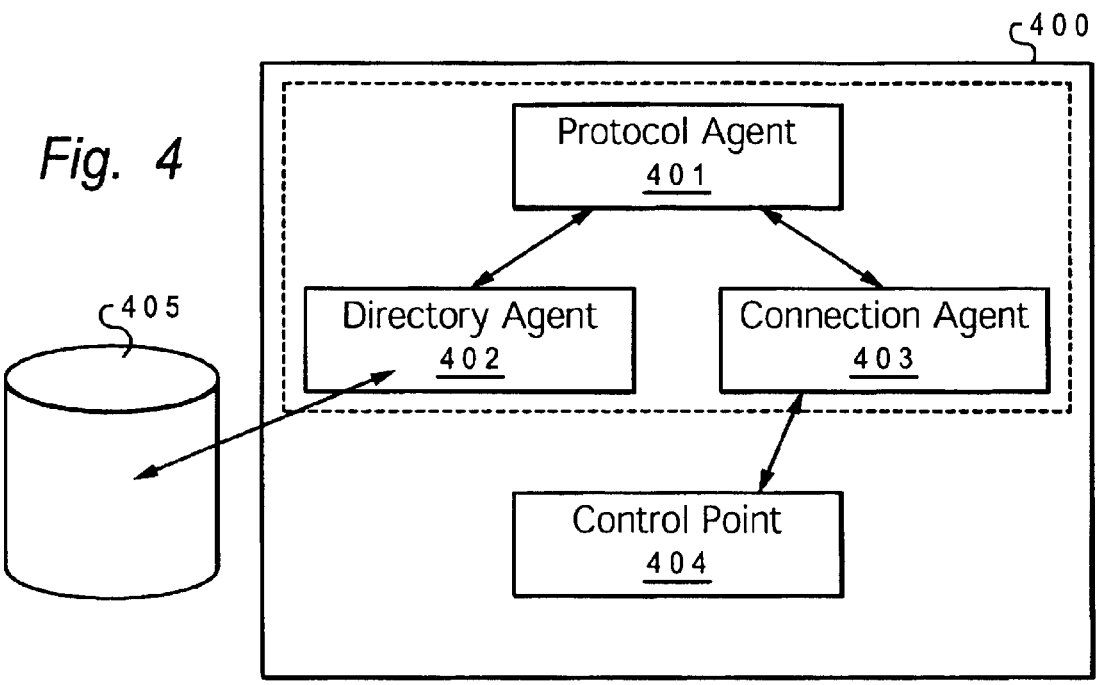
FIG. 4 is a block diagram depicting the internal structure of an access agent in accordance with a preferred embodiment of the present invention.

With reference now to FIG. 4, there is depicted a block diagram depicting the internal structure of an access agent in accordance with a preferred embodiment of the present invention. As shown in FIG. 4, an access agent 400 includes three logically separate components. A protocol agent (PA) 401 understands and interprets the access protocol (the System Network Architecture protocol). A directory agent (DA) 402 is utilized for locating resources across the network, and a connection agent (CA) 403 establishes connections between access agents.

The external behavior of a particular access agent is primarily characterized by the protocol agent 401 as it is responsible for participating in protocol exchanges with attached external devices and networks and mapping these protocols to the protocols used by the backbone network. Protocol agent 401 uses directory agent 402 to locate the various resources with which protocol agent 401 needs to communicate across the NBBS network. Protocol agent 401 then uses connection agent 403 to establish and maintain reserved or best effort network connections with other access agents. Such transport connections can then be used to transport SNA data traffic in accordance with the teachings of the present invention.

Directly agent 402 is responsible for the registration and localization of information related to services provided by access agent 400. Directory agent 402 references a local directory database (LDB) 405 and provides a distributed directory service throughout the network. Directory agent 402 performs three main functions. First, directory agent 402 registers available users through its access agent 400. Directory agent 402 also localizes users on behalf of protocol agent 401. Directory agent further responds to queries to locate users that are received from other directory agents.

Users of the Network

A "user" is identified uniquely by its "resource name", which describes the user in its native protocol. An access agent 400 in an access node communicates with users using their native protocols and names, but uses the particular network protocols and names when communicating with other network nodes. Directory services is responsible for the mapping of a resource name into a particular network name.

A user's resource name is specified using the following three values: Resource Identifier Type (this describes the addressing scheme used for this user (E.164, X.121, NSAP, etc.); Resource Identifier (this identifies a user within the syntax of the network described by the resource identifier type); and Resource Identifier Prefix (the prefix is used to group together users of the same resource identifier type). The identifier prefix is optional and used when directory services implements directory sets.

Distributed and Local Directory Database

Directory services uses a distributed directory database. Each directory agent 402 maintains its own LDB 405 which contains information about users of the network. LDB 405 contains records for a subset of all the users of the network. Combining all the LDBs from the directory agents would give a complete view of the distributed directory database. This is different from the topology services with its fully replicated topology database that gives every node a complete view of the network's topology.

A LDB agent is managed by each directory agent. A node will have multiple LDBs if there are multiple access agents within on the node. From the perspective of directory services within a network node, there are two types of users: local users and remote users. Local users are those that gain access to the network through the object directory agent. Remote users are those that gain access to the network through a different directory agent.

The directory database contains a number of directory entries. An entry is present for each local user. There are also entries for some of the remote users. The information that is maintained in a directory entry includes, among other parameters: resource identifier and prefix; resource identifier type; network addresses of the resource's access agent components (directory agent, protocol agent, connection agent).

Information stored within LDB 405 is gathered from various different sources. Home entries for local or remote users are generated in the local node using configuration information provided by the customer. Registered entries includes information about local users and may be provided using signaling resulting from an external search. A cached entry is an entry obtained when remote users are located as a result of distributed queries (searches), and the resultant information is cached.

Distributed Queries

Directory services always inspects LDB 405 for a target user. If the target user is a local user, then a distributed query is not required. If directory agent 402 needs to inspect another part of the distributed directory database, a distributed query is used in order to locate a target user.

A distributed queries is so-called because it is a search which is distributed among a group of remote directory agents. Distributed queries are sent from an origin directory agent to one or more destination directory agents, using either a directory set (a directory set is a group of directory agents which support users with the same longest matching address prefix) or a Spanning Tree.

Undirected Explicit Queries

An undirected explicit query is used if LDB 405 does not contain any information about the user to be located. The origin directory agent multicasts the query to the appropriate directory group, using a default distribution tree (a default distribution tree is a tree which spans all the members of a particular directory set). A remote directory agent will only reply to this type of query if it provides access to the destination user. A positive reply means that the destination user is a local member of the directory database of the destination directory agent. When a directory agent replies positively to a query, it will provide the location of the target user, in terms of the addresses of its access agent components.

Connection Agent

Connection agent 403 is responsible for the establishment and ongoing maintenance of network connections that are provided by the Network Connection Layer. Protocol agent 401 uses connection agent 403 to set up, maintain and take down the various network connections that are required to support the services provided by the access agent.

Functional Addresses

In a NBBS architecture, a number of reserved labels known as inter node or intra node functional addresses are implemented by every NBBS node. These predefined labels are reserved for the network control services and they are used to multicast control messages through the network or the node. There are two categories of functional addresses: internode functional addresses and intranode functional addresses.

Internode functional addresses are used for the control messages that use the network spanning tree as the transport mechanism between all NBBS nodes within the network, and include for example: a functional address for topology services, which is used for distributing topology database updates; a functional address for directory services, that is used for undirected explicit queries (UEQ); and access agent specific addresses that are used to transport information between all access agents of a given type. Generally, internode functional addressesare used to allow for multicasting capabilities between groups of destinations using the network spanning tree; and to multicast on a network wide basis control messages to every node within the network. Intranode functional addresses are used to deliver a message to multiple destinations within an NBBS node.

Rapid Transport Protocol (RTP)

RTP is a connection-oriented, full duplex protocol, designed to transport information in broadband multi-services networks. The following features are provided in RTP: message segmentation and reassembly, a window-based congestion control mechanism; a mechanism to detect a loss of information to be exchanged with remote RTP partners (this mechanism allows the triggering of recovery mechanisms); the ability to multiplex multiple RTP transport connections onto a single network connection; the in-order delivery of messages; and a reliable delivery option that is a fundamental requirement in a SNA environment.

RTP provides a reliable transport mechanism to its users and therefore performs error detection and correction on its transport connections. The byte sequence numbers in the RTP header are used by RTP to detect and indicate errors or gaps in transmissions. RTP calculates the byte sequence number of the expected packet from the byte sequence number and user message length (fields in the RTP header). The byte sequence number in the RTP header identifies the first byte of the payload in this particular packet. If a packet arrives with higher than expected byte sequence number, RTP can deduce that one or more user messages (or segments) have been lost. RTP can then request that lost bytes be re-transmitted using the status segment.

IP Protocols

Nodes implementing the TN3270 and TN3270 Enhanced (TN3270 E) protocols have traditionally required a full implementation of the TCP/IP protocol suite. The method and system of the present invention strictly limit the implementation of the IP protocols in NBBS nodes to their bare minimum. Complex dynamic IP routing protocols such as RIP (Routing Information protocol) or OSPF (Open Short Path First) do not need to be implemented within the NBBS nodes. A simple static routing table within the client access agents is sufficient to provide the client access agents with the routing information related to messages to send to SNA terminals.

The present invention discloses a system and method for establishing SNA sessions between SNA nodes through a packet/cell switching network, in particular an NBBS network, using Telnet 3270 access services. More particularly, the present invention implements Telnet 3270 and Telnet 3270 E services as access agents of an NBBS network. SNA nodes attach to TN3270 access agents which provide Telnet 3270 services for the transport of SNA traffic across a wide area network infrastructure.

Figure 3:
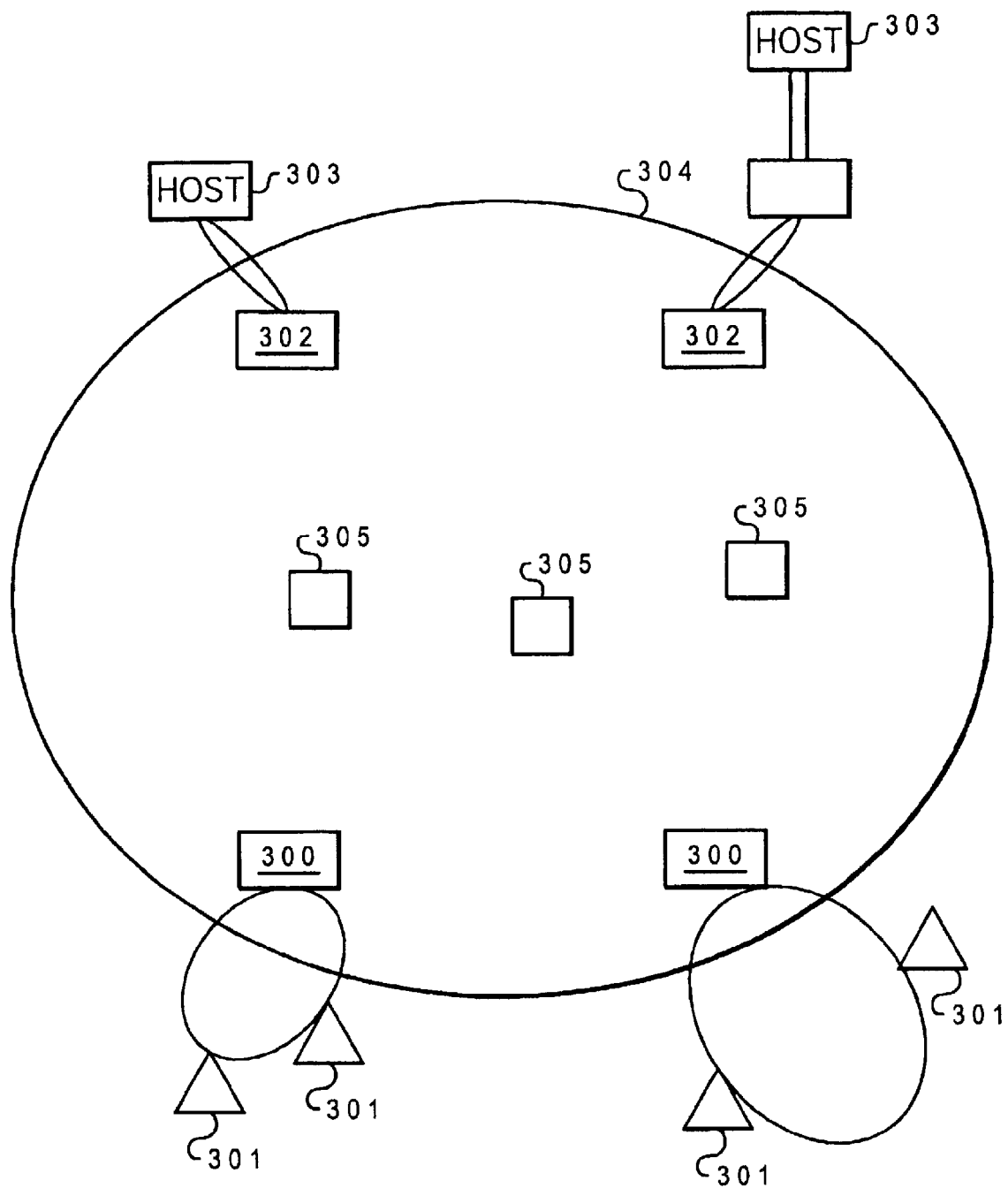
FIG. 3 illustrates TN 3270 client and server access agents as implemented in a wide area network in accordance with a preferred embodiment of the present invention.

Turning now to FIG. 3, there is illustrated TN 3270 client and server access agents as implemented in a wide area network in accordance with a preferred embodiment of the present invention. First, a client access agent 300 connects all of multiple SNA terminal devices 301 running the TN3270 client software. A server access agent 302 connects or providing access to SNA host devices 303 where the SNA applications reside.

Client access agents 300 receive Telnet 3270 connection requests from SNA terminal devices 301. Using the NBBS protocols, one of client access agent 301 locates the TN3270 server access agents capable of providing access to the requested target SNA resource from across a NBBS network 304. Based on parameters returned by server access agents 302, client access agent 300 selects one server access agent among the multiple possible candidates. This server access agent is selected to provide optimal access to the desired target SNA resource. Then, the client access agent sets up a connection across the wide area network to the selected server access agent. The requested connection is dedicated for the transport of SNA traffic.

Establishment of SNA Sessions
Client Protocol Agent

Figure 5:
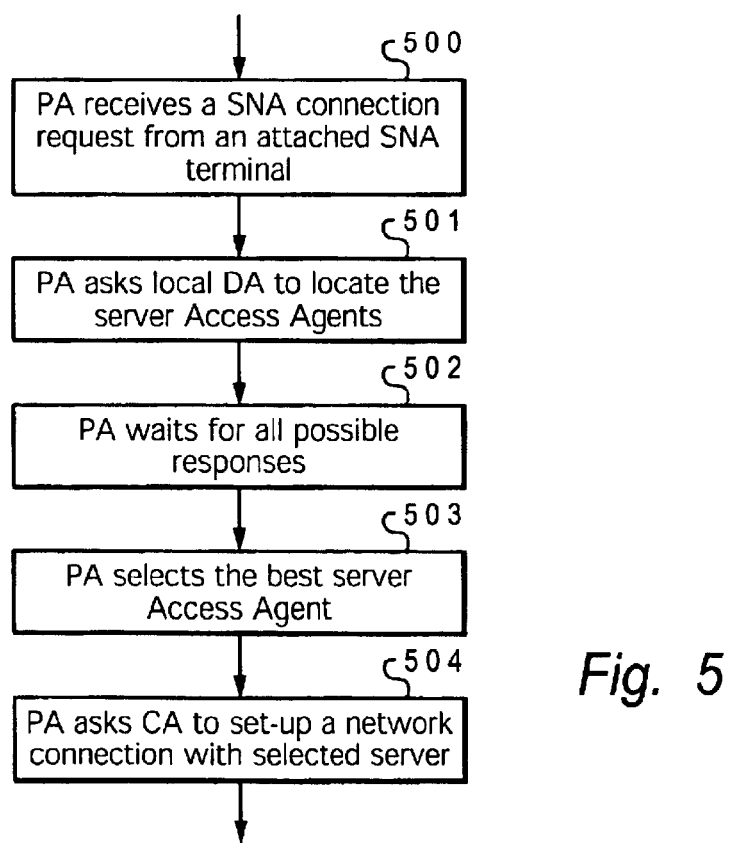
FIG. 5 is a flow diagram illustrating steps performed by a client protocol agent during SNA session setup in accordance with a preferred embodiment of the present invention.

Turning now to FIG. 5, a flow diagram illustrates steps performed by a client protocol agent (the same in construction and functionality as protocol agent 401) within client access agent 300 during SNA session setup in accordance with a preferred embodiment of the present invention. In particular the flow diagram in FIG. 5 describes method steps by which the client protocol agent sets up a connection with server access agent 302.

As depicted at step 500, a client protocol agent within client access agent 300 receives an SNA session request from an attached SNA terminal 301. This SNA session request will: trigger the setup of an NBBS connection request from client access agent 300 to server access agent 302.

Next, at step 501 the client protocol agent requests of its local directory agent to locate the server access agents that potentially provide services for the Logical Unit corresponding to the SNA terminal, that is the source or origin of the SNA session request. The client protocol agent specifies to the local directory agent that the LDB cannot be used for this protocol. The client protocol agent also specifies that the Query Scope is "All", which means that all replies from the potential server access agents must be returned by the directory agent to the requesting client protocol agent.

Proceeding to step 502, the client protocol agent waits for all possible positive responses received from the destination server protocol agents. These responses are collected by the local directory agent within the requesting client access agent 300. The time period during which the client protocol agent waits accounts for the different response time possibilities of the destination server access agents susceptible to respond positively to the query operation initiated by the origin directory agent.

As illustrated at step 503, the client protocol agent selects among all responses collected by the local origin directory agent, the destination server access agent that presents the optimum capabilities for servicing the requested Telnet session. The manner in which destination server access agent metrics are defined and used to characterize a server's capabilities are implementation specific to provide maximum flexibility. In a preferred embodiment, the server capability to process a request is a variable that ranges from 0 to 255 (0 when the server is to be avoided if possible, 255 if the server is completely available).

Next, as depicted at step 504, the client protocol agent requests that its local connection agent set up a reserved RTP connection with the selected destination server access agent. Parameters for setting up of the connection are the parameters that were returned by the selected server access agent as a result of the previous query at step 503. These parameters are transported by a query reply directory Service control message (Locate-reply, Find-Reply, Export). Parameter are contained within the Export part of the query reply. These parameters include the following bandwidth reservation metrics as defined in the NBBS architecture: R, the peak rate for the connection; M, the mean rate for the connection; and B, the burstiness associated with the connection.

Connection Characteristics

The server access agent (sharing the same configuration as access agent 400) is initialized with a list of the source SNA resources (Logical Units) associated with the origin access nodes (TN3270 clients) that it provides services for, and the characteristics associated with the data traffic to be transported to and from these origin access nodes (TN3270 clients).

As an example, when the Logical Unit (LU) is an LU dedicated to screen related interaction (LU Type 2 in the SNA architecture), the parameters (bandwidth reservation metric) associated with the transport connection will be different from the parameters associated with LUs devoted to print traffic (LU Type 1 or 3 in the SNA architecture). This distinction allows the network to better adapt to the characteristics of the traffic to be transported, i.e. screen traffic (interactive) can have a better treatment than print traffic (batch).

Server Protocol Agent

Figure 6:
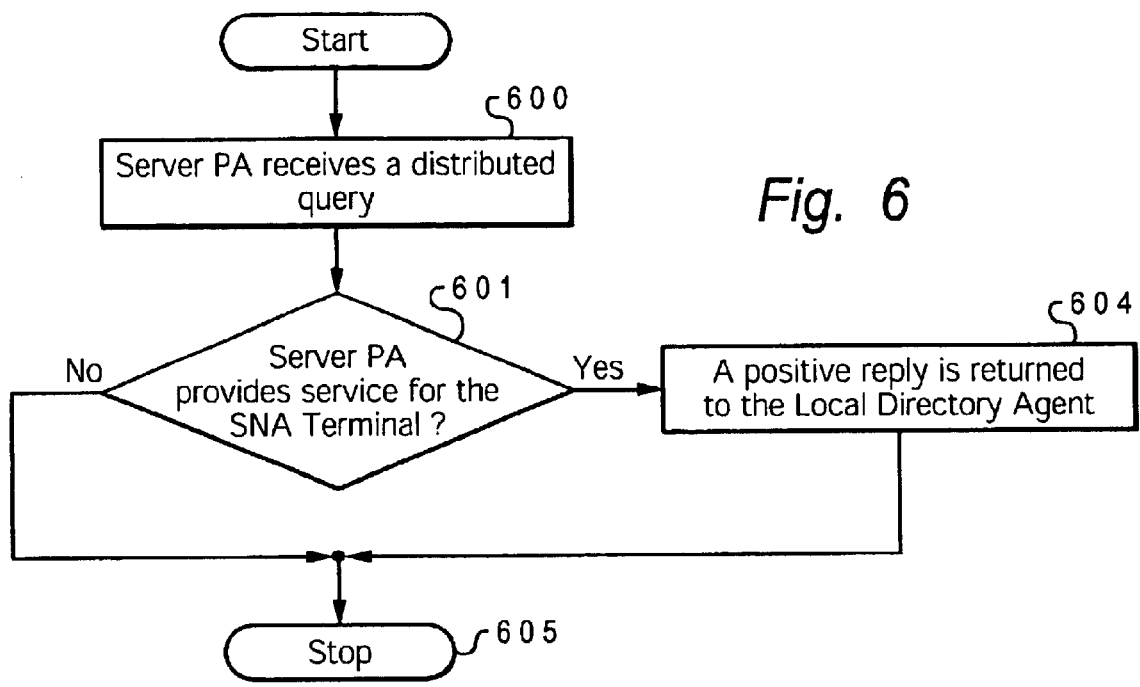
FIG. 6 is a flow diagram depicting steps performed by a server protocol agent during SNA session setup in accordance with a preferred embodiment of the present invention.

With reference now to FIG. 6, there is illustrated a flow diagram depicting steps performed by a server protocol agent during SNA session setup in accordance with a preferred embodiment of the present invention. Specifically, FIG. 6 describes a method of setting up a network connection in a server protocol agent (the same in construction as protocol agent 401 within a destination server access agent 302.

As depicted at step 600, the server protocol agent within destination access agent 302 receives from its local directory agent a distributed query control message from a client access agent 300 within the origin access agent. Next, as shown at step 601, the server protocol agent determines whether or not it provides services for the SNA terminal that sent the request for a Telnet session at the origin of the query control message. This verification is based on the LU name of the requesting SNA device that is contained in the query control message (In the Export part of the Locate Request, Find Request, Export control message).

If the server protocol agent determines that it does not provide service for the source SNA terminal, and as shown at step 605, the server access agent does not provide service for this SNA terminal and the processing of the protocol agent is terminated.

If, however, the server protocol agent determines that it does provide service for the source SNA terminal, then as depicted at step 604, a positive reply is returned to the local directory agent (the destination directory agent) with the required information about the server access agent actual load, as well as the necessary information about the connection (the bandwidth reservation metric) to establish between the client and the server protocol agents.

NBBS Directory Services
User's Resource Naming Convention

SNA resources are identified via their Logical Unit (LU) names. In the SNA architecture, a LU is the logical port through which a user or application obtains access to the network. For TN3270 implementations, LUs are defined (and therefore resources reserved, such as control blocks) within the TN3270 server to represent the resources associated with the TN3270 clients. In the context of the system and method of the present invention, the SNA resources within the NBBS network, are represented as follows. First, a resource identifier type is set to "SNA_LU" to specify that the resource identifier relates to an SNA resource (a Logical Unit). Next, a resource identifier uniquely identifies a resource within a resource identifier type. The resource identifier is a character string containing the name of a Logical Unit (or a pool of Logical Units, as defined by the TN3270 standards). The NBBS directory services base their searches on the use of this user's resource naming conventions.

Origin Directory Agent

Figure 7:
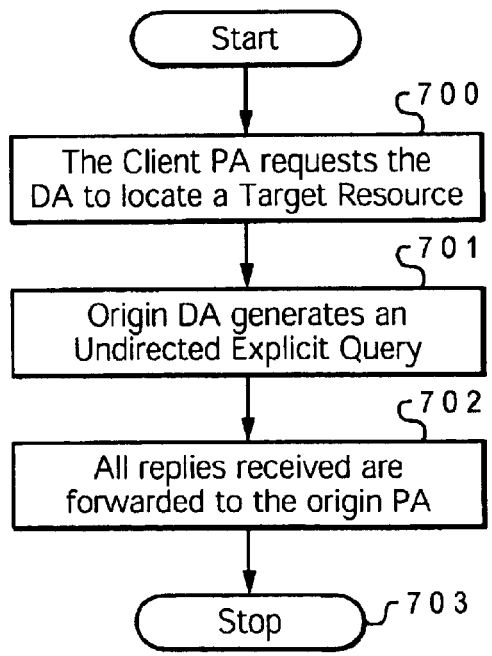
FIG. 7 is a flow diagram illustrating steps performed by an origin directory agent during SNA session setup in accordance with a preferred embodiment of the present invention.

Turning now to FIG. 7, there is depicted a flow diagram illustrating steps performed by an origin (source) directory agent during SNA session setup in accordance with a preferred embodiment of the present invention. Specifically, FIG. 7 depicts the method used by the directory agent (the same in construction as directory agent 402) within an origin client access agent 300 according to the present invention.

As shown at step 700, the protocol agent of client access agent 300 requests of its local origin directory agent to locate a target resource (a Logical Unit or a Logical Unit Pool). The message requesting the setup of a Telnet session received by origin client access agent 300 from an SNA terminal is forwarded as a parameter and is delivered by the directory query flows to the server access agents 302 (via the Export Generalized Data Stream—GDS variable, part of the Locate Request, Find Request, Export query control message). The protocol agent specifies to the local directory agent that the LDB cannot be used for this protocol. It also specifies that the Query Scope is "All", which means that all replies from the potential server access agents must be returned by the directory agent to the requesting protocol agent.

Consequently, as illustrated at step 701, since the LDB is not used, the origin directory agent generates an Undirected Explicit Query (UEQ) whose target is all the protocol agents that are part of a server access agent (as opposed to all the access agents that provide TN3270 services which also include the set of all client access agents).

Proceeding to step 702, all positive replies to the UEQ are forwarded to the Origin protocol agent. The content of the LDB is not updated by the results of the query, because the related information cannot be saved and reused later on.

Destination Directory Agent

Figure 8:
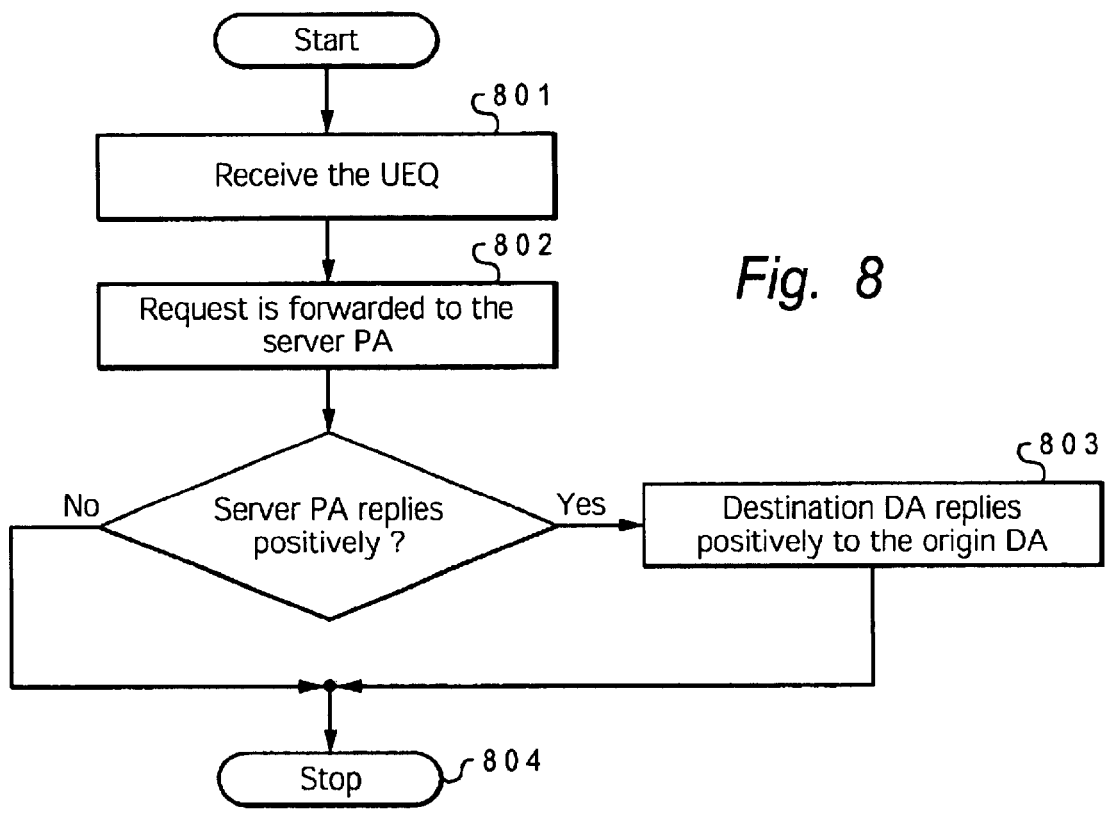
FIG. 8 is a flow diagram depicting steps performed by a destination directory agent during SNA session setup in accordance with a preferred embodiment of the present invention.

With reference now to FIG. 8, there is illustrated a flow diagram depicting steps performed by a destination directory agent during SNA session setup in accordance with a preferred embodiment of the present invention. As shown at step 800, the destination directory agent receives a UEQ from the origin directory agent. Next, at step (802 the session setup request (comprising an Export GDS variable) is forwarded to the server protocol agent.

If the server protocol agent replies positively to the request, and as depicted at step 803 the local directory agent (the destination directory agent) replies to the origin directory agent by providing the server access agent load, the metric to be used for the connection (the bandwidth reservation metric), as well as all the information that relates to optional. TN3270 features such as a print indication.

This reply is returned to the requesting origin directory agent via a positive Locate-reply, Find-Reply, Export control message, with all the required information about the server access agent actual load, as well as the necessary information about the connection (the Bandwidth reservation metric) to be established between the client and the server protocol agents. As shown at step 804, if th e server protocol agent replies negatively to the session setup request, the destination directory agent's task is complete.

While the invention has been particularly shown and described with reference to a preferred embodiment, it will be understood that various changes in form and detail may be made therein without departing from the spirit, and scope of the invention.

What is claimed is:

1. A method for establishing a Systems Network Architecture (SNA) session between SNA resources through a packet/cell switching network having an origin access node that provides client access services and at least one destination access node that provides server access services, said method comprising:
   receiving a SNA session request from a source SNA resource for establishing an SNA session with a target SNA resource;
   broadcasting an undirected message over said packet/cell switching network;
   receiving one or more positive replies from respectively one or a plurality of destination access nodes that support said source SNA resource and that provide server access services, wherein said receiving includes:
      retrieving information relating to a traffic handling capacity of said destination access node; and
      retrieving a bandwidth reservation metric related to an establishment of a connection between said origin access node and said destination access node;
   selecting a destination access node in accordance with said information describing said destination node and in accordance with said information related to establishment of a connection between said origin access node and said destination node; and
   establishing a connection between said origin access node and said selected destination access node in accordance with said selecting.

2. The method of claim 1, wherein said step of retrieving a bandwidth reservation metric comprises:
   determining a peak transmission rate for said connection;
   determining a mean rate for said connection; and
   determine a burstiness associated with the connection.

3. The method of claim 1, wherein said step of receiving one or more positive replies from respectively one or a plurality of destination access nodes further comprises retrieving information related to a traffic load of said destination access node.

4. The method of claim 1, further comprising:
   identifying said source SNA resource or said destination SNA resource within said packet/cell switching network by:
      identifying a SNA resource identifier type for a SNA resource; and
      identifying a resource identifier to uniquely identify said SNA resource within said SNA resource identifier type.

5. The method of claim 1, wherein said target SNA resource is a SNA logical unit.

6. The method of claim 1, wherein said packet/cell switching network is a networking broadband services network.

7. The method of claim 1, further comprising:
   receiving said undirected message within said destination access node from said origin access node;
   in response to said destination access node supporting said source SNA resource:
      sending a positive reply to said origin access node, wherein said step of sending a positive reply includes:
         sending information related to a traffic handling capacity of said destination access node; and
         sending information related to establishment of a connection between said origin access node and said destination access node.

8. The method of claim 7, further comprising:
   storing a list of source SNA resources that said destination access node supports; and
   storing information related to establishment of a connection between said origin access node and said destination access node for each supported source SNA resource.

9. The method of claim 8, wherein said step of storing information related to establishment of a connection between said origin access node and said destination access node comprises storing a bandwidth reservation metric for said connection.

10. The method of claim 9, wherein said step of storing a bandwidth reservation metric comprises:
    storing a peak transmission rate for said connection;
    storing a mean transmission rate for said connection; and
    storing a burstiness associated with said connection.

11. The method of claim 7, wherein said step of sending a positive reply to said origin access node comprises sending information related to a traffic load of said destination access node.

12. A system for establishing a Systems Network Architecture (SNA) session between SNA resources through a packet/cell switching network having an origin access node that provides client access services and at least one destination access node that provides server access services, said system comprising:
    processing means for receiving a SNA session request from a source SNA resource for establishing an SNA session with a target SNA resource;
    processing means for broadcasting an undirected message over said packet/cell switching network;
    processing means for receiving one or more positive replies from respectively one or a plurality of destination access nodes that support said source SNA resource and that provide server access services, wherein said processing means for receiving one or more positive replies includes:
       processing means for retrieving information relating to a traffic handling capacity of said destination access node; and
       processing means for retrieving a bandwidth reservation metric related to establishment of a connection between said origin access node and said destination access node;
    processing means for selecting a destination access node in accordance with said information describing said destination node and in accordance with said information related to establishment of a connection between said origin access node and said destination node; and processing means for establishing a connection between said origin access node and said selected destination access node in accordance with said selection of a destination access node.

13. The system of claim 12, wherein said processing mean for retrieving a bandwidth reservation metric comprises:

processing means for determine a peak transmission rate for said connection;

processing means for determining a mean rate for said connection; and processing means for determining a burstiness associated with the connection.

14. The system of claim 12, wherein said processing means for receiving one or more positive replies from respectively one or a plurality of destination access nodes further comprises processing means for retrieving information related to a traffic load of said destination access node.

15. The system of claim 12, further comprising:

processing means for identifying said source SNA resource or said destination SNA resource within said packet/cell switching network including:

processing means for identifying a SNA resource identifier type for a SNA resource; and processing means for identifying a resource identifier to uniquely identify said SNA resource within said SNA resource identifier type.

16. The system of claim 12, wherein said target SNA resource is a SNA logical unlit.

17. The system of claim 12, wherein said packet/cell switching network is a networking broadband services network.

18. The system of claim 12, further comprising:

processing means for receiving said undirected message within said destination access node from said origin access node;

processing means for, in response to said destination access node supporting said source SNA resource;

sending a positive reply to said origin access node, wherein said processing means for sending a positive reply includes;

sending information related to a traffic handling capacity of said destination access node; and sending information related to establishment of a connection between said origin access node and said destination access node.

19. The system of claim 18, further comprising:

processing means for storing a list of source SNA resources that said destination access node supports; and processing means for storing information related to establishment of a connection between said origin access node and said destination access node for each supported source SNA resource.

20. The system of claim 19, wherein said processing means for storing information related to establishment of a connection between said origin access node and said destination access node comprises processing means for storing a bandwidth reservation metric for said connection.

21. The system of claim 20, wherein said processing means for storing a bandwidth reservation metric comprises:

processing means for storing a peak transmission rate for said connection;

processing means for storing a mean transmission rate for said connection; and processing means for storing a burstiness associated with said connection.

22. The system of claim 18, wherein said processing means for sending a positive reply to said origin access node comprises processing means for sending information related to a traffic load of said destination access node.

23. The system of claim 12, wherein said origin access node is a telnet 3270 client access node.

24. The system of claim 12, wherein said destination access node is a telnet 3270 server access node.

25. A program product resided in a computer readable medium for establishing a Systems Network Architecture (SNA) session between SNA resources through a packet/cell switching network having an origin access node that provides client access services and at least one destination access node that provides server access services, said program product comprising:

instruction means for receiving a SNA session request from a source SNA resource for establishing an SNA session with a target SNA resource;

instruction means for broadcasting an undirected message over said packet/cell switching network;

instruction means for receiving one or more positive replies from respectively one or a plurality of destination access nodes that support said source SNA resource and that provide server access services, wherein said instruction means for receiving one or more positive replies includes:

instruction means for retrieving information relating to a traffic handling capacity of said destination access node; and instruction means for retrieving a bandwidth reservation metric related to establishment of a connection between said origin access node and said destination access node;

instruction means for selecting a destination access node in accordance with said information describing said destination node and in accordance with said information related to establishment of a connection between said origin access node and said destination node; and instruction means for establishing a connection between said origin access node and said selected destination access node in accordance with said selection of a destination access node.

26. The program product of claim 25, wherein said instruction means for retrieving a bandwidth reservation metric comprises:

instruction means for determining a peak transmission rate for said connection;

instruction means for determining a mean rate for said connection; and instruction means for determining a burstiness associated with the connection.

27. The program product of claim 25, wherein said instruction means for receiving one or more positive replies from respectively one or a plurality of destination access nodes further comprises instruction means for retrieving information related to a traffic load of said destination access node.

28. The program product of claim 25, further comprising:

instruction means for identifying said source SNA resource or said destination SNA resource within said packet/cell switching network including:

instruction means for identifying a SNA resource identifier type for a SNA resource; and instruction means for identifying a resource identifier to uniquely identify said SNA resource within said SNA resource identifier type.

29. The program product of claim 25, wherein said target SNA resource is a SNA logical unit.

30. The program product of claim 25, wherein said packet/cell switching network is a networking broadband services network.

31. The program product of claim 25, further comprising:

instruction means for receiving said undirected message within said destination access node from said origin access node;

instruction means for, in response to said destination access node supporting said source SNA resource:

sending a positive reply to said origin access node, wherein said instruction means for sending a positive reply includes:

sending information related to a traffic handling capacity of said destination access node; and sending information related to establishment of a connection between said origin access node and said destination access node.

32. The program product of claim 31, further comprising:

instruction means for storing a list of source SNA resources that said destination access node supports; and instruction means for storing information related to establishment of a connection between said origin access node and said destination access node for each supported source SNA resource.

33. The program product of claim 32, wherein said instruction means for storing information related to establishment of a connection between said origin access node and said destination access node comprises instruction means for storing a bandwidth reservation metric for said connection.

34. The program product of claim 33, wherein said instruction means for storing a bandwidth reservation metric comprises:

instruction means for storing a peak transmission rate for said connection;

instruction means for storing a mean transmission rate for said connection; and instruction means for storing a burstiness associated with said connection.

35. The program product of claim 31, wherein said instruction means for sending a positive reply to said origin access node comprises instruction means for sending information related to a traffic load of said destination access node.

* * * * *